United States Patent
Chin et al.

(10) Patent No.: US 9,247,466 B2
(45) Date of Patent: Jan. 26, 2016

(54) SYSTEM AND METHOD OF IMPROVING REDIRECTION IN A TD-SCDMA CIRCUIT-SWITCHED FALLBACK FROM TDD-LTE SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 609 days.

(21) Appl. No.: 12/977,496

(22) Filed: Dec. 23, 2010

(65) Prior Publication Data

US 2012/0163249 A1    Jun. 28, 2012

(51) Int. Cl.
   *H04J 3/00*       (2006.01)
   *H04W 36/00*      (2009.01)
   *H04W 36/14*      (2009.01)

(52) U.S. Cl.
   CPC ...... *H04W 36/0066* (2013.01); *H04W 36/0022* (2013.01); *H04W 36/14* (2013.01)

(58) Field of Classification Search
   CPC .............. H04W 36/0066; H04W 36/0022
   USPC .......................................................... 370/280
   See application file for complete search history.

(56) References Cited

U.S. PATENT DOCUMENTS

| | | | | |
|---|---|---|---|---|
| 2005/0020297 A1* | 1/2005 | Axness | ............... | H04B 1/5825 455/552.1 |
| 2008/0212516 A1* | 9/2008 | Son et al. | ..................... | 370/315 |
| 2009/0157704 A1* | 6/2009 | Wang | ........................... | 707/100 |
| 2009/0163212 A1* | 6/2009 | Hall et al. | ..................... | 455/438 |
| 2010/0172301 A1* | 7/2010 | Watfa | ............... | H04W 36/0022 370/328 |
| 2010/0273490 A1* | 10/2010 | Velde | ................. | H04W 36/007 455/436 |
| 2010/0278142 A1* | 11/2010 | Dwyer | ............. | H04W 36/0083 370/331 |
| 2012/0069731 A1* | 3/2012 | Tooher | ............... | H04W 76/026 370/221 |

FOREIGN PATENT DOCUMENTS

| | | | |
|---|---|---|---|
| CN | 1491522 A | 4/2004 | |
| EP | 2124489 A1 * | 11/2009 | |
| EP | 2124489 A1 * | 11/2009 | ............ H04W 36/14 |

OTHER PUBLICATIONS

International Search Report and Written Opinion—PCT/US2011/025111, International Search Authority—European Patent Office—Sep. 29, 2011.

(Continued)

*Primary Examiner* — Shripal Khajuria
*Assistant Examiner* — Faisal Choudhury
(74) *Attorney, Agent, or Firm* — Darren M. Simon

(57) ABSTRACT

Certain aspects of the present disclosure propose techniques for improving redirection in a TD-SCDMA circuit-switched fallback from TDD-LTE systems. Certain aspects provide a method that generally includes initiating a call setup (CS) procedure for leaving a base station (BS) of a first radio access technology (RAT) for a call on a second RAT, receiving, in response to the CS procedure, a message from the BS of the first RAT comprising a system frame number (SFN) for the BS of the first RAT and an offset number for a BS of the second RAT for setting up the call, and generating an estimated SFN for the BS of the second RAT based on the SFN for the BS of the first RAT and the offset number.

62 Claims, 7 Drawing Sheets

(56) References Cited

OTHER PUBLICATIONS

Nec et al: "On the need for signalling Target Cell SFN during Handover", 3GPP Draft; R2-083361, 3rd Generation Partnership Project (3GPP), Mobile Competence Centre ; 650, Route Des Lucioles ; F-06921 Sophia-Antipolis Cedex ; France, vol. RAN WG2, No. Warsaw, Poland; 20080624, Jun. 24, 2008, XP050140759.

Redirection enhancements to UTRAN, 3GPP Draft; 25331_CR4118_(REL-9)_RP-100314, 3rd Generation Partnership Project (3GPP), Mobile Competence Centre ; 650, Route Des Lucioles ; F-06921 Sophia-Antipolis Cedex ; France, vol. RAN WG2, No. Beijing, china; 20100412, Mar. 27, 2010, XP050422246.

Taiwan Search Report—TW100105289—TIPO—Sep. 15, 2013.

\* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

SYSTEM AND METHOD OF IMPROVING REDIRECTION IN A TD-SCDMA CIRCUIT-SWITCHED FALLBACK FROM TDD-LTE SYSTEMS

BACKGROUND

1. Field

Certain aspects of the present disclosure generally relate to wireless communications and, more particularly, to improving a TD-SCDMA circuit-switched fallback from TDD-LTE systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In an aspect of the disclosure, a method for wireless communications is provided. The method generally includes receiving, from a user equipment (UE), a request for a call setup (CS) procedure for leaving a base station (BS) of a first radio access technology (RAT) for a call on a second RAT; and transmitting, in response to the request, a message comprising a system frame number (SFN) for the BS of the first RAT and an offset number for a BS of the second RAT for setting up the call.

In an aspect of the disclosure, an apparatus for wireless communications is provided. The apparatus generally includes means for receiving, from a user equipment (UE), a request for a call setup (CS) procedure for leaving a base station (BS) of a first radio access technology (RAT) for a call on a second RAT; and means for transmitting, in response to the request, a message comprising a system frame number (SFN) for the BS of the first RAT and an offset number for a BS of the second RAT for setting up the call.

In an aspect of the disclosure, an apparatus for wireless communications is provided. The apparatus generally includes at least one processor and a memory coupled to the at least one processor. The at least one processor is typically adapted to receive, from a user equipment (UE), a request for a call setup (CS) procedure for leaving a base station (BS) of a first radio access technology (RAT) for a call on a second RAT; and transmit, in response to the request, a message comprising a system frame number (SFN) for the BS of the first RAT and an offset number for a BS of the second RAT for setting up the call.

In an aspect of the disclosure, a computer-program product is provided. The computer-program product generally includes a computer-readable medium having code for receiving, from a user equipment (UE), a request for a call setup (CS) procedure for leaving a base station (BS) of a first radio access technology (RAT) for a call on a second RAT; and transmitting, in response to the request, a message comprising a system frame number (SFN) for the BS of the first RAT and an offset number for a BS of the second RAT for setting up the call.

In an aspect of the disclosure, a method for wireless communications is provided. The method generally includes initiating a call setup (CS) procedure for leaving a base station (BS) of a first radio access technology (RAT) for a call on a second RAT; receiving, in response to the CS procedure, a message from the BS of the first RAT comprising a system frame number (SFN) for the BS of the first RAT and an offset number for a BS of the second RAT for setting up the call; and generating an estimated SFN for the BS of the second RAT based on the SFN for the BS of the first RAT and the offset number.

In an aspect of the disclosure, an apparatus for wireless communications is provided. The apparatus generally includes means for initiating a call setup (CS) procedure for leaving a base station (BS) of a first radio access technology (RAT) for a call on a second RAT; means for receiving, in response to the CS procedure, a message from the BS of the first RAT comprising a system frame number (SFN) for the BS of the first RAT and an offset number for a BS of the second RAT for setting up the call; and means for generating an estimated SFN for the BS of the second RAT based on the SFN for the BS of the first RAT and the offset number.

In an aspect of the disclosure, an apparatus for wireless communications is provided. The apparatus generally includes at least one processor and a memory coupled to the at least one processor. The at least one processor is typically adapted to initiate a call setup (CS) procedure for leaving a base station (BS) of a first radio access technology (RAT) for a call on a second RAT; receive, in response to the CS procedure, a message from the BS of the first RAT comprising a system frame number (SFN) for the BS of the first RAT and an offset number for a BS of the second RAT for setting up the call; and generate an estimated SFN for the BS of the second RAT based on the SFN for the BS of the first RAT and the offset number.

In an aspect of the disclosure, a computer-program product is provided. The computer-program product generally includes a computer-readable medium having code for initiating a call setup (CS) procedure for leaving a base station (BS) of a first radio access technology (RAT) for a call on a second RAT; receiving, in response to the CS procedure, a message from the BS of the first RAT comprising a system frame number (SFN) for the BS of the first RAT and an offset number for a BS of the second RAT for setting up the call; and generating an estimated SFN for the BS of the second RAT based on the SFN for the BS of the first RAT and the offset number.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates an example list of downlink/uplink (DL/UL) configurations in a frame in the TDD-LTE standard in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
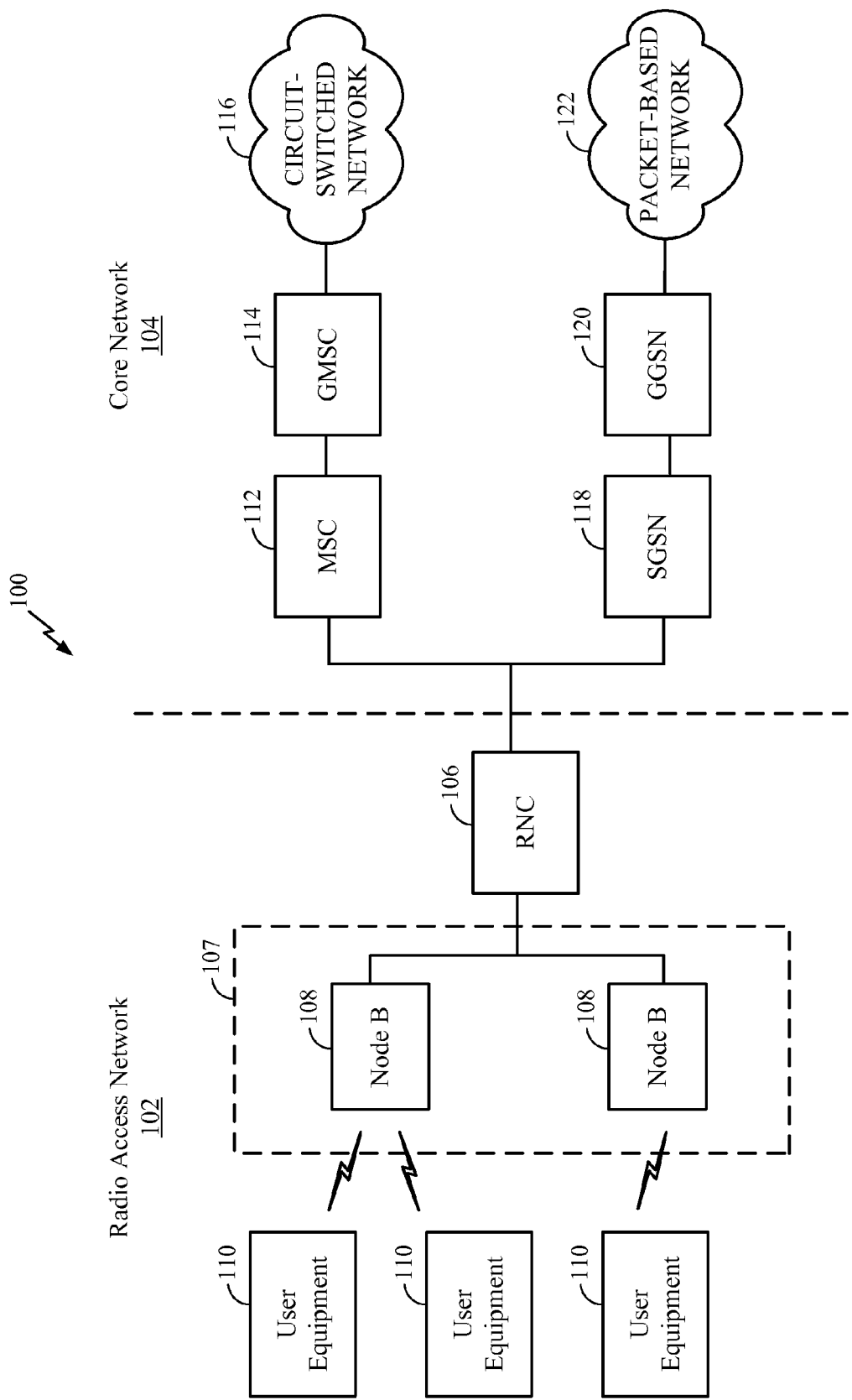
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
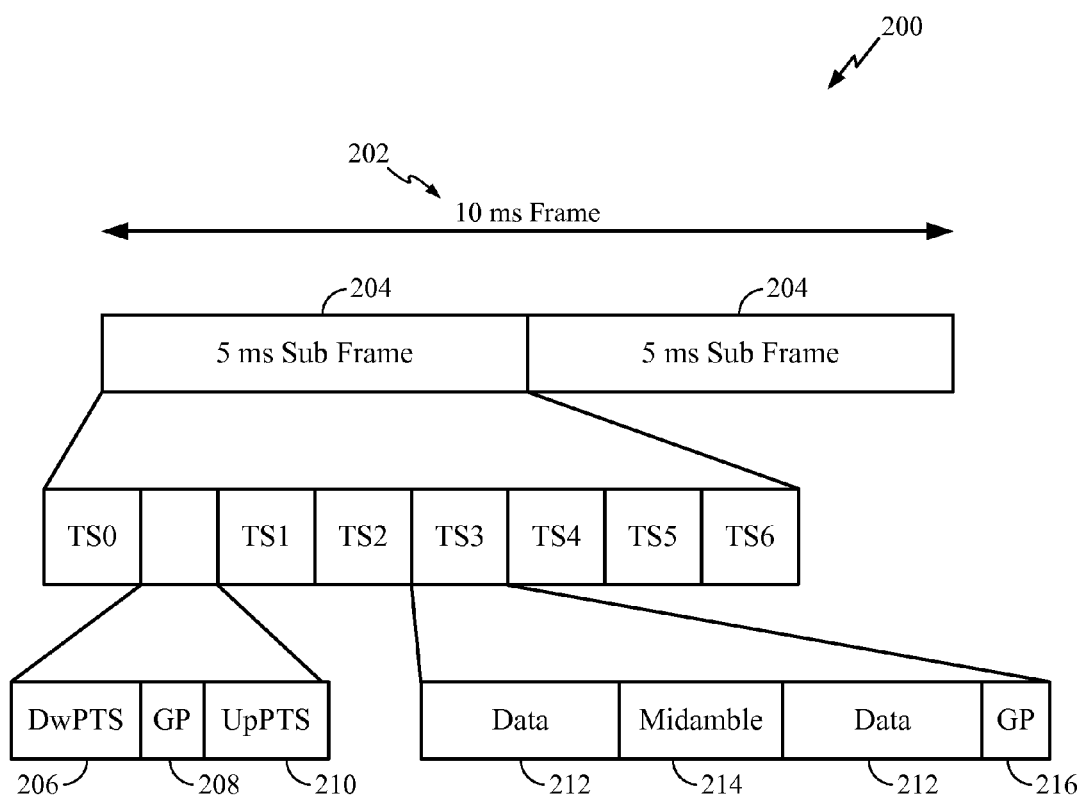
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference. TS0 may be used for transmitting overhead channels, for example, a primary common control physical channel (P-CCPCH). The P-CCPCH may carry a broadcast control channel (BCCH) logical channel. Further, a system information message may be broadcasted in the P-CCPCH. The transmission time interval (TTI) for the P-CCPCH may be 20 ms. The system information may comprise a system frame number (SFN) of a first frame of the TTI of the system information transmission (SFNprime). The SFN in TD-SCDMA may have 12 bits (e.g., 0~4,095).

Figure 3:
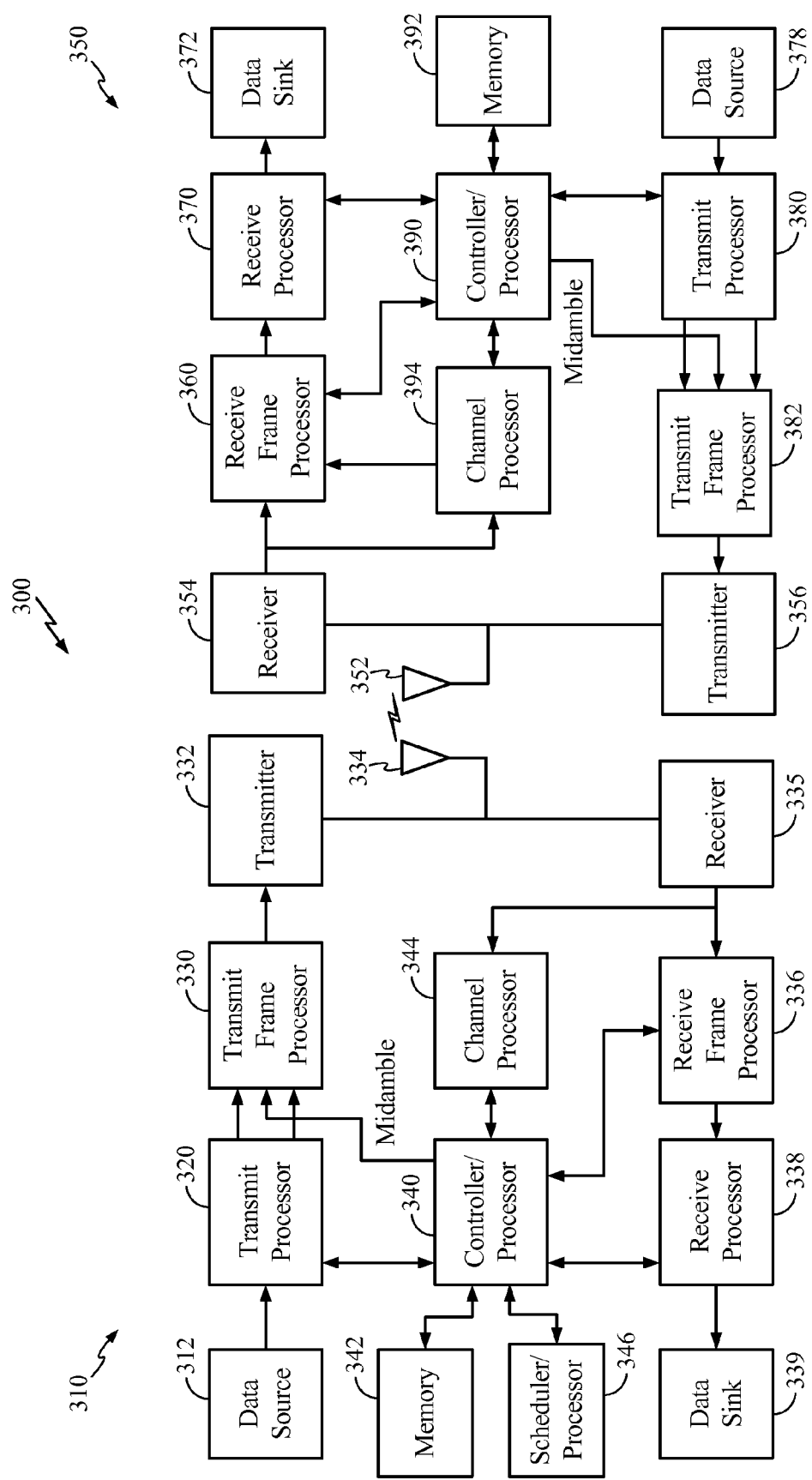
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 4:
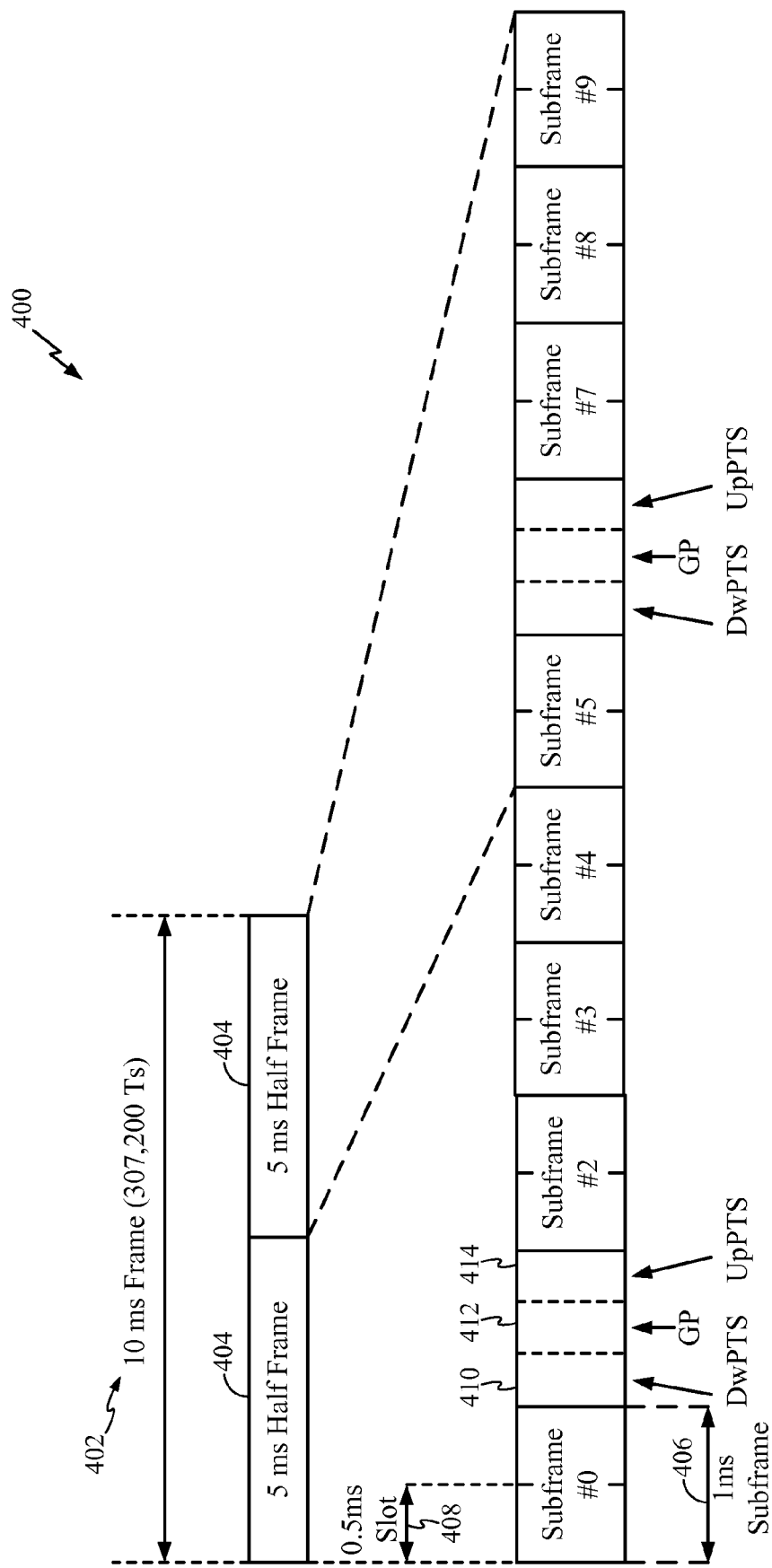
FIG. 4 is a block diagram conceptually illustrating an example of a frame structure in a telecommunications system in accordance with certain aspects of the present disclosure.

FIG. 4 shows a frame structure 400 for a Time Division Duplex Long Term Evolution (TDD-LTE) carrier. The TDD-LTE carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (S). Downlink subframes and uplink subframes may be divided into two 0.5 ms slots 408. Special subframes may be divided into a downlink pilot time slot (DwPTS) 410, a guard period (GP) 412, and an uplink pilot time slot (UpPTS) 414. Depending on the configuration, the duration of DwPTS, UpPTS, and GP may vary. A physical broadcast channel (PBCH) may be transmitted in the first subframe of a half frame 404, centered at the TDD-LTE transmission bandwidth. The PBCH may use 1.08 MHz bandwidth (or six resource blocks). The PBCH may carry a master information block (MIB), and the TTI for the PBCH may be 40 ms. The MIB may carry a system frame number (SFN). The SFN in TDD-LTE may have 10 bits (e.g., 0~1, 023). For some embodiments, the SFN in MIB signals may have only the 8 most significant bits (MSBs) of the SFN since the 2 least significant bits (LSBs) may be derived by detecting the 40 ms transmission.

FIG. 5 illustrates an example list of the downlink/uplink configurations in a TDD-LTE frame 402 according to the LTE standard. In this table D, U, and S indicate Downlink, Uplink and Special subframes 406, respectively. The special subframe S may consist of DwPTS 410, GP 412, and UpPTS 414 fields. As illustrated, several DL/UL configurations for 5 ms switch point periodicity and 10 ms switch point periodicity may be chosen for a TDD-LTE frame 402. The configurations 0, 1, and 2 have two identical 5 ms half-frames 404 within a 10 ms TDD-LTE frame 402.

System and Method of Improving Redirection in a TD-SCDMA Circuit-Switched Fallback from TDD-LTE Systems TDD-LTE may be deployed in a way such that frame transmission is synchronous for a base station (BS), and therefore the frame boundary may be in sync with a TD-SCDMA system. However, the system frame number (SFN) in TDD-LTE may not be synchronous. In the initial deployment of TDD-LTE, TDD-LTE may not provide IMS (IP Multimedia Subsystem) voice service and, therefore, the voice service may need to fall back to use the TD-SCDMA circuit-switched voice (i.e., circuit-switched fallback (CSFB)). 3GPP standards have supported the CSFB procedure to allow the voice call being set up when a user equipment (UE) is in the TDD-LTE in an idle or connected mode.

In a CSFB procedure, the UE may first perform an extended service request procedure in the LTE network. Next, the BS of the LTE network may release the connection with redirection to the frequency or the cell where the UE may camp on the TD-SCDMA network (e.g., by transmitting an RRCConnectionRelease message). To expedite the voice call setup, the RRCConnectionRelease message may comprise the system information of the each TD-SCDMA candidate cell to which the UE is being re-directed. Next, the UE may tune the frequency or the cell as re-directed and acquire the TD-SCDMA signal. The UE may perform a random access procedure to set up a radio resource control (RRC) connection. The UE may perform the CS voice call setup procedure, starting from sending a connection management (CM) SERVICE REQUEST message.

As described above, in an effort to reduce call setup delay in CSFB, LTE standards may allow for the BS of the LTE network to send UTRAN SYSTEM INFORMATION in the LTE RRCConnectionRelease message in order to avoid the procedure for the UE to acquire the system information. However, the SYSTEM INFORMATION may contain the SFNprime information element (IE) which may be difficult to indicate the correct SFN of the TD-SCDMA system due to the random and unpredictable delay to send the RRCConnectionRelease after the message is constructed. For example, if the RRCConnectionRelease message is retransmitted, the SFNprime IE may not be updated to reflect the current SFN of the TD-SCDMA system.

For some embodiments, a new N-bit SFN offset field may be added between the TDD-LTE SFN and the TD-SCDMA SFN in the RRCConnectionRelease message. The bit size of the offset number (N-bit) may be less than or equal to 10 because there may be only 10 bits of SFN in TDD-LTE. The SFN offset may be denoted by SFN_Offset, defined as:

$$TD\text{-}SCDMA\_SFN \bmod 2^N = (TDD\text{-}LTE\_SFN + SFN\_Offset) \bmod 2^N.$$

Since the SFNs in TDD-LTE and TD-SCDMA continue to increment, SFN_Offset may remain a stable value and, therefore, the BS of the LTE network may obtain this value. However, SFNprime may still indicate SFN of TD-SCDMA system around the radio frame when the RRCConnectionRelease message is prepared. Further, since the SFN in TD-SCDMA may be 12 bits, summing the SFN in TDD-LTE and the offset number may not equal the actual SFN in TD-SCDMA since the SFN in TDD-LTE may be only 10 bits.

For some embodiments, an improved redirection in the TD-SCDMA CSFB from TDD-LTE systems will be further described herein. When the UE receives the RRCConnectionRelease message, the UE may record the current SFN of the TDD-LTE network (TDD-LTE_SFN). The UE may estimate the N least significant bits (LSBs) of the TD-SCDMA SFN as follows:

$$L\_TD\text{-}SCDMA\_SFN = (TDD\text{-}LTE\_SFN + SFN\_Offset) \bmod 2^N,$$

where L_TD-SCDMA_SFN is an estimate of the N LSBs of the TD-SCDMA SFN.

Figure 6:
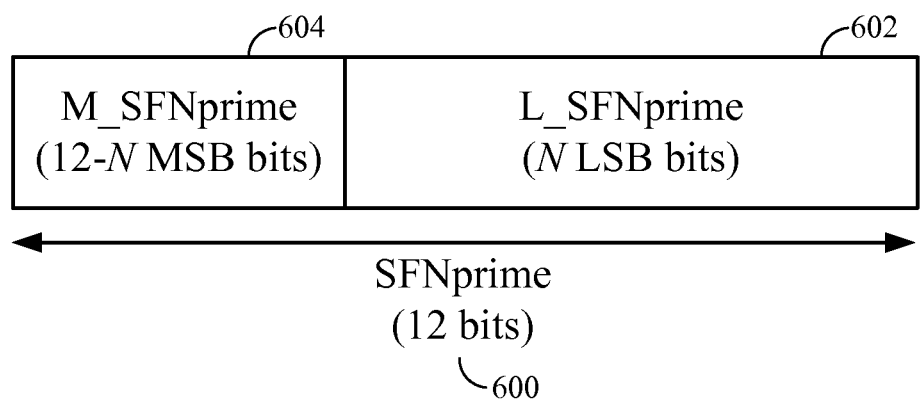
FIG. 6 illustrates an SFNprime information element in accordance with certain aspects of the present disclosure.

Next, the UE may compare between the estimate of the N LSBs of the TD-SCDMA SFN (L_TD-SCDMA_SFN) and N LSBs of SFNprime (L_SFNprime) to generate a corrected SFN of the TD-SCDMA network (i.e., the current TD-SCDMA SFN). FIG. 6 illustrates an SFNprime IE 600 comprising the N LSBs of SFNprime (L_SFNprime) 602. Since the SFN in TD-SCDMA may be 12 bits, the most significant bits (MSBs) of SFNprime (M_SFNprime) 604 may be 12−N in length.

Upon comparison, if L_TD-SCDMA_SFN is greater than or equal to L_SFNprime, there may have been no wrapping around of the N LSBs of the TD-SCDMA SFN from the time SFNprime was set in preparing the signaling message (RRCConnectionRelease). Therefore, the corrected SFN of the TD-SCDMA network may be computed as follows:

$$TD\text{-}SCDMA\_SFN = L\_TD\text{-}SCDMA\_SFN + M\_SFNprime*2^N.$$

However, if L_TD-SCDMA_SFN is less than L_SFNprime, there may have been wrapping around of the N LSBs of the TD-SCDMA SFN from the time SFNprime was set in preparing the signaling message. Therefore, the corrected SFN of the TD-SCDMA network may be computed as follows:

$$TD\text{-}SCDMA\_SFN = (L\_TD\text{-}SCDMA\_SFN + (M\_SFNprime+1)*2^N) \bmod 4096,$$

wherein the actual 12-bit TD-SCDMA_SFN may be adjusted by one in the M_SFNprime value (i.e., incremented). Modulo 4096 may allow (M_SFNprime+1)* $2^N$ to wrap around. The bit size of SFN_Offset is large enough so that there may be at most one wrap around. The N bits of SFN_Offset may be selected depending on the maximum delay of transmitting the message. For example, the maximum delay may be around $\frac{1}{2}*10*2^N$ ms. For example, if the delay cannot be more than 1 second, then at least 8 bits may need to be provided.

Figure 7:
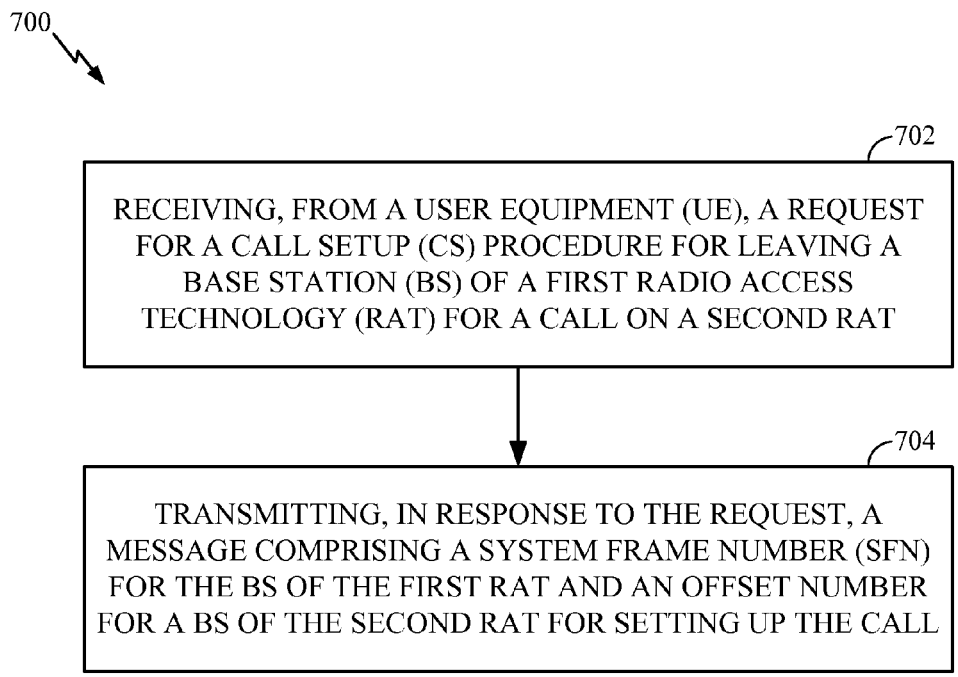
FIG. 7 illustrates example operations for enabling a UE to perform network acquisition operations from a base station (BS) of a first radio access technology (RAT) to a BS of a second RAT, in accordance with certain aspects of the present disclosure.

FIG. 7 illustrates example operations 700 in accordance with certain aspects of the present disclosure. The operations 700 may be performed, for example, by a BS of a first RAT in enabling a UE to perform network acquisition operations with a BS of a second RAT. At 702, the BS of the first RAT may receive, from the UE, a request for a call setup (CS) procedure for leaving the BS of the RAT for a call on the second RAT. At 704, the BS of the first RAT may transmit, in response to the request, a message comprising a system frame number (SFN) for the BS of the first RAT and an offset number for the BS of the second RAT for setting up the call.

Figure 8:
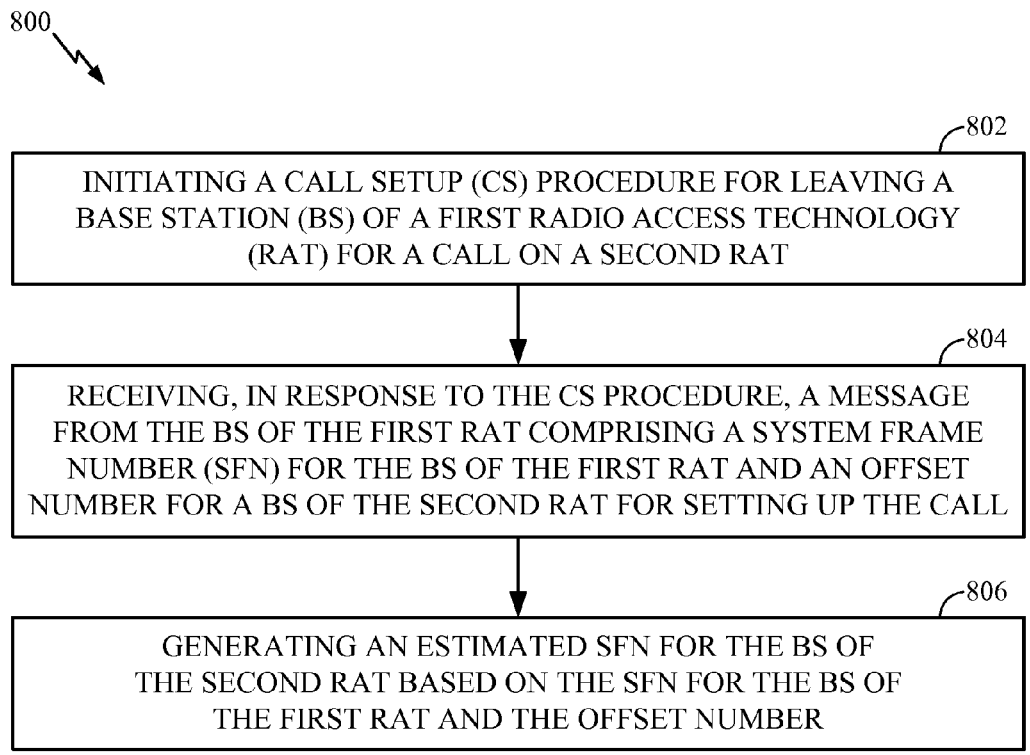
FIG. 8 illustrates example operations for leaving a BS of a first RAT for a call on a second RAT, in accordance with certain aspects of the present disclosure.

FIG. 8 illustrates example operations 800 in accordance with certain aspects of the present disclosure. The operations 800 may be performed, for example, by a UE in leaving a BS of a first RAT for a call on a second RAT. At 802, the UE may initiate a call setup (CS) procedure for leaving the BS of the first RAT for a call on the second RAT. At 804, the UE may receive, in response to the CS procedure, a message from the BS of the first RAT comprising a system frame number (SFN) for the BS of the first RAT and an offset number for a BS of the second RAT for setting up the call. At 806, the UE may generate an estimated SFN for the BS of the second RAT based on the SFN for the BS of the first RAT and the offset number.

Embodiments of the present disclosure may allow a UE to acquire the TD-SCDMA SFN through a signaling message in the TDD-LTE network (e.g., RRCConnectionRelease). The UE may be able to acquire the TD-SCDMA signal with an accurate SFN that is pre-determined in the TDD-LTE network and perform the voice call setup. Therefore, the delay of CS fallback from TDD-LTE to TD-SCDMA may be shortened.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
   receiving, from a user equipment (UE), a request for a handover procedure for leaving a base station (BS) of a first radio access technology (RAT) for a call on a second RAT; and
   transmitting, in response to the request, a message comprising a system frame number (SFN) for the BS of the first RAT, a SFN for the BS of the second RAT, and an offset number for a BS of the second RAT for setting up the call, the message transmitted to enable a UE to generate a corrected SFN for the BS of the second RAT based on a comparison of N least significant bits (LSBs) of an estimated SFN for the BS of the second RAT and N LSBs of the SFN for the BS of the second RAT and to perform network acquisition operations with the BS of the second RAT using the corrected SFN, the estimated SFN generated based on the SFN for the BS of the first RAT, the SFN for the BS of the second RAT, and the offset number.

2. The method of claim 1, wherein the first RAT comprises Time Division Duplex Long Term Evolution (TDD-LTE).

3. The method of claim 1, wherein the second RAT comprises Time Division Synchronous Code Division Multiple Access (TD-SCDMA).

4. The method of claim 1, wherein the SFN for the BS of the second RAT is determined when the message is prepared by the BS of the first RAT.

5. The method of claim 1, wherein a bit size of the offset number is determined based at least in part on a maximum delay of transmitting the message.

6. The method of claim 1, wherein a bit size of the offset number is less than or equal to a bit size of the SFN for the BS of the first RAT.

7. The method of claim 1, wherein the message is a radio resource control (RRC) connection release message.

8. The method of claim 1, wherein the handover procedure is a circuit switched fall back (CSFB) procedure.

9. An apparatus for wireless communications, comprising:
   means for receiving, from a user equipment (UE), a request for a handover procedure for leaving a base station (BS) of a first radio access technology (RAT) for a call on a second RAT; and
   means for transmitting, in response to the request, a message comprising a system frame number (SFN) for the BS of the first RAT, a SFN for the BS of the second RAT, and an offset number for a BS of the second RAT for setting up the call, the message transmitted to enable a UE to generate a corrected SFN for the BS of the second RAT based on a comparison of N least significant bits (LSBs) of an estimated SFN for the BS of the second RAT and N LSBs of the SFN for the BS of the second RAT and to perform network acquisition operations with the BS of the second RAT using the corrected SFN, the estimated SFN generated based on the SFN for the BS of the first RAT, the SFN for the BS of the second RAT, and the offset number.

10. The apparatus of claim 9, wherein the first RAT comprises Time Division Duplex Long Term Evolution (TDD-LTE).

11. The apparatus of claim 9, wherein the second RAT comprises Time Division Synchronous Code Division Multiple Access (TD-SCDMA).

12. The apparatus of claim 9, wherein the SFN for the BS of the second RAT is determined when the message is prepared by the BS of the first RAT.

13. The apparatus of claim 9, wherein a bit size of the offset number is determined based at least in part on a maximum delay of transmitting the message.

14. The apparatus of claim 9, wherein a bit size of the offset number is less than or equal to a bit size of the SFN for the BS of the first RAT.

15. The apparatus of claim 9, wherein the message is a radio resource control (RRC) connection release message.

16. The apparatus of claim 9, wherein the handover procedure is a circuit switched fall back (CSFB) procedure.

17. An apparatus for wireless communications, comprising:
   at least one processor adapted to:
      receive, from a user equipment (UE), a request for a handover procedure for leaving a base station (BS) of a first radio access technology (RAT) for a call on a second RAT; and transmit, in response to the request, a message comprising a system frame number (SFN) for the BS of the first RAT, a SFN for the BS of the second RAT, and an offset number for a BS of the second RAT for setting up the call, the message transmitted to enable a UE to generate a corrected SFN for the BS of the second RAT based on a comparison of N least significant bits (LSBs) of an estimated SFN for the BS of the second RAT and N LSBs of the SFN for the BS of the second RAT and to perform network acquisition operations with the BS of the second RAT using the corrected SFN, the estimated SFN generated based on the SFN for the BS of the first RAT, the SFN for the BS of the second RAT, and the offset number; and a memory coupled to the at least one processor.

18. The apparatus of claim 17, wherein the first RAT comprises Time Division Duplex Long Term Evolution (TDD-LTE).

19. The apparatus of claim 17, wherein the second RAT comprises Time Division Synchronous Code Division Multiple Access (TD-SCDMA).

20. The apparatus of claim 17, wherein the SFN for the BS of the second RAT is determined when the message is prepared by the BS of the first RAT.

21. The apparatus of claim 17, wherein a bit size of the offset number is determined based at least in part on a maximum delay of transmitting the message.

22. The apparatus of claim 17, wherein a bit size of the offset number is less than or equal to a bit size of the SFN for the BS of the first RAT.

23. The apparatus of claim 17, wherein the message is a radio resource control (RRC) connection release message.

24. The apparatus of claim 17, wherein the handover procedure is a circuit switched fall back (CSFB) procedure.

25. A computer-program product, comprising:
a non-transitory computer-readable medium comprising code for:
receiving, from a user equipment (UE), a request for a handover procedure for leaving a base station (BS) of a first radio access technology (RAT) for a call on a second RAT; and
transmitting, in response to the request, a message comprising a system frame number (SFN) for the BS of the first RAT, a SFN for the BS of the second RAT, and an offset number for a BS of the second RAT for setting up the call, the message transmitted to enable a UE to generate a corrected SFN for the BS of the second RAT based on a comparison of N least significant bits (LSBs) of an estimated SFN for the BS of the second RAT and N LSBs of the SFN for the BS of the second RAT and to perform network acquisition operations with the BS of the second RAT using the corrected SFN, the estimated SFN generated based on the SFN for the BS of the first RAT, the SFN for the BS of the second RAT, and the offset number.

26. The computer-program product of claim 25, wherein the first RAT comprises Time Division Duplex Long Term Evolution (TDD-LTE).

27. The computer-program product of claim 25, wherein the second RAT comprises Time Division Synchronous Code Division Multiple Access (TD-SCDMA).

28. The computer-program product of claim 25, wherein the SFN for the BS of the second RAT is determined when the message is prepared by the BS of the first RAT.

29. The computer-program product of claim 25, wherein a bit size of the offset number is determined based at least in part on a maximum delay of transmitting the message.

30. The computer-program product of claim 25, wherein a bit size of the offset number is less than or equal to a bit size of the SFN for the BS of the first RAT.

31. The computer-program product of claim 25, wherein the message is a radio resource control (RRC) connection release message.

32. The computer-program product of claim 25, wherein the handover procedure is a circuit switched fall back (CSFB) procedure.

33. A method for wireless communications, comprising:
initiating a handover procedure for leaving a base station (BS) of a first radio access technology (RAT) for a call on a second RAT;
receiving, in response to initiating the handover procedure, a message from the BS of the first RAT comprising a system frame number (SFN) for the BS of the first RAT, a SFN for the BS of the second RAT, and an offset number for a BS of the second RAT for setting up the call;
generating an estimated SFN for the BS of the second RAT based on the SFN for the BS of the first RAT, the SFN for the BS of the second RAT, and the offset number;
comparing N least significant bits (LSBs) of the estimated SFN and N LSBs of the SFN for the BS of the second RAT;
generating a corrected SFN for the BS of the second RAT based on the comparison; and
performing network acquisition operations with the BS of the second RAT using the corrected SFN.

34. The method of claim 33, wherein the first RAT comprises Time Division Duplex Long Term Evolution (TDD-LTE).

35. The method of claim 33, wherein the second RAT comprises Time Division Synchronous Code Division Multiple Access (TD-SCDMA).

36. The method of claim 33, wherein the SFN for the BS of the second RAT is determined during the handover procedure.

37. The method of claim 36, wherein comparing comprises detecting a wrap around of the N LSBs of the estimated SFN.

38. The method of claim 37, wherein upon detecting the wrap around, generating the corrected SFN comprises incrementing 12−N most significant bits (MSBs) of the SFN for the BS of the second RAT.

39. The method of claim 37, wherein a bit size of the offset number is large enough such that there is at most one wrap around of the N LSBs of the estimated SFN.

40. The method of claim 39, wherein the bit size of the offset number is determined based at least in part on a maximum delay of receiving the message.

41. The method of claim 39, wherein the bit size of the offset number is less than or equal to a bit size of the SFN for the BS of the first RAT.

42. The method of claim 33, wherein the handover procedure is a circuit switched fall back (CSFB) procedure.

43. An apparatus for wireless communications, comprising:
at least one processor adapted to:
initiate a handover procedure for leaving a base station (BS) of a first radio access technology (RAT) for a call on a second RAT;
receive, in response to the handover procedure, a message from the BS of the first RAT comprising a system frame number (SFN) for the BS of the first RAT, a SFN for the BS of the second RAT, and an offset number for a BS of the second RAT for setting up the call; and generate an estimated SFN for the BS of the second RAT based on the SFN for the BS of the first RAT, the SFN for the BS of the second RAT, and the offset number;

compare N least significant bits (LSBs) of the estimated SFN and N LSBs of the SFN for the BS of the second RAT;

generate a corrected SFN for the BS of the second RAT based on the comparison; and perform network acquisition operations with the BS of the second RAT using the corrected SFN; and a memory coupled to the at least one processor.

44. The apparatus of claim 43, wherein the first RAT comprises Time Division Duplex Long Term Evolution (TDD-LTE).

45. The apparatus of claim 43, wherein the second RAT comprises Time Division Synchronous Code Division Multiple Access (TD-SCDMA).

46. The apparatus of claim 43, wherein the SFN for the BS of the second RAT is determined during the handover procedure.

47. The apparatus of claim 46, wherein the at least one processor adapted to compare comprises detecting a wrap around of the N LSBs of the estimated SFN.

48. The apparatus of claim 47, wherein upon detecting the wrap around, the at least one processor is adapted to generate the corrected SFN comprises incrementing 12−N most significant bits (MSBs) of the SFN for the BS of the second RAT.

49. The apparatus of claim 47, wherein a bit size of the offset number is large enough such that there is at most one wrap around of the N LSBs of the estimated SFN.

50. The apparatus of claim 49, wherein the bit size of the offset number is determined based at least in part on a maximum delay of receiving the message.

51. The apparatus of claim 49, wherein the bit size of the offset number is less than or equal to a bit size of the SFN for the BS of the first RAT.

52. The apparatus of claim 43, wherein the handover procedure is a circuit switched fall back (CSFB) procedure.

53. A computer-program product, comprising:

a non-transitory computer-readable medium comprising code for:

initiating a handover procedure for leaving a base station (BS) of a first radio access technology (RAT) for a call on a second RAT;

receiving, in response to the handover procedure, a message from the BS of the first RAT comprising a system frame number (SFN) for the BS of the first RAT, a SFN for the BS of the second RAT, and an offset number for a BS of the second RAT for setting up the call;

generating an estimated SFN for the BS of the second RAT based on the SFN for the BS of the first RAT, the SFN for the BS of the second RAT, and the offset number;

comparing N least significant bits (LSBs) of the estimated SFN and N LSBs of the SFN for the BS of the second RAT;

generating a corrected SFN for the BS of the second RAT based on the comparison; and performing network acquisition operations with the BS of the second RAT using the corrected SFN.

54. The computer-program product of claim 53, wherein the first RAT comprises Time Division Duplex Long Term Evolution (TDD-LTE).

55. The computer-program product of claim 53, wherein the second RAT comprises Time Division Synchronous Code Division Multiple Access (TD-SCDMA).

56. The computer-program product of claim 53, wherein the SFN for the BS of the second RAT is determined during the handover procedure.

57. The computer-program product of claim 56, wherein the code for comparing comprises code for detecting a wrap around of the N LSBs of the estimated SFN.

58. The computer-program product of claim 57, wherein upon detecting the wrap around, code for generating the corrected SFN comprises incrementing 12−N most significant bits (MSBs) of the SFN for the BS of the second RAT.

59. The computer-program product of claim 57, wherein a bit size of the offset number is large enough such that there is at most one wrap around of the N LSBs of the estimated SFN.

60. The computer-program product of claim 59, wherein the bit size of the offset number is determined based at least in part on a maximum delay of receiving the message.

61. The computer-program product of claim 59, wherein the bit size of the offset number is less than or equal to a bit size of the SFN for the BS of the first RAT.

62. The computer-program product of claim 53, wherein the handover procedure is a circuit switched fall back (CSFB) procedure.

\* \* \* \* \*